US012619372B2

(12) United States Patent
Wu et al.

(10) Patent No.: US 12,619,372 B2
(45) Date of Patent: May 5, 2026

(54) DATA MIGRATION METHOD, SYSTEM AND DEVICE FOR STORAGE SERVER, AND NON-TRANSITORY READABLE STORAGE MEDIUM

(71) Applicant: SUZHOU METABRAIN INTELLIGENT TECHNOLOGY CO., LTD., Suzhou (CN)

(72) Inventors: Ruizhen Wu, Suzhou (CN); Xiaowei Wang, Suzhou (CN); Lin Wang, Suzhou (CN); Jingjing Chen, Suzhou (CN); Yongxing Zhang, Suzhou (CN); Xu Zhang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 70 days.

(21) Appl. No.: 18/724,994

(22) PCT Filed: Dec. 23, 2022

(86) PCT No.: PCT/CN2022/141684
§ 371 (c)(1),
(2) Date: Jun. 27, 2024

(87) PCT Pub. No.: WO2024/001112
PCT Pub. Date: Jan. 4, 2024

(65) Prior Publication Data
US 2025/0060897 A1      Feb. 20, 2025

(30) Foreign Application Priority Data

Jun. 30, 2022    (CN) .......................... 202210759836.4

(51) Int. Cl.
*G06F 3/06* (2006.01)
*G06F 16/11* (2019.01)

(52) U.S. Cl.
CPC .......... *G06F 3/0647* (2013.01); *G06F 3/0604* (2013.01); *G06F 3/067* (2013.01); *G06F 16/119* (2019.01)

(58) Field of Classification Search
CPC ...... G06F 3/0647; G06F 3/0604; G06F 3/067; G06F 16/119
See application file for complete search history.

(56) References Cited

U.S. PATENT DOCUMENTS

| | | | | |
|---|---|---|---|---|
| 5,524,204 A | * | 6/1996 | Verdoorn, Jr. ...... | G06F 11/1096 714/E11.034 |
| 6,530,004 B1 | * | 3/2003 | King ................... | G06F 11/1096 714/E11.034 |

(Continued)

FOREIGN PATENT DOCUMENTS

| | | |
|---|---|---|
| CN | 106293526 A | 1/2017 |
| CN | 108255413 A | 7/2018 |

(Continued)

OTHER PUBLICATIONS

Yu Mao, "A New Parity-Based Migration Method to Expand RAID-5", IEEE, Aug. 2014 https://ieeexplore.ieee.org/abstract/document/6654136 (Year: 2014).*

(Continued)

*Primary Examiner* — Kenneth M Lo
(74) *Attorney, Agent, or Firm* — Merchant & Gould P.C.

(57)      ABSTRACT

Disclosed are a data migration method, system and device for a storage server, and a non-transitory readable storage medium. The method includes: according to storage information of a storage server, determining the number n of strips to be migrated; selecting n stripes to be migrated from among c full stripes according to a preset migration rule, and selecting, from the n stripes to be migrated, data blocks to be migrated and migrating the data blocks to the newly inserted disks, so that after the migration is completed, the difference (Continued)

in stripe usage between any two disks in the storage server does not exceed 1; and determining data content of check data blocks of the strips so as to complete data migration of the storage server, and determining data content of check data blocks of the c-n strips by means of incremental update of an erasure code.

14 Claims, 6 Drawing Sheets

(56) References Cited

U.S. PATENT DOCUMENTS

| | | | | |
|---|---|---|---|---|
| 6,970,987 | B1* | 11/2005 | Ji | G06F 11/1076 |
| | | | | 711/170 |
| 8,898,394 | B2* | 11/2014 | Kondo | G06F 3/0647 |
| | | | | 714/48 |
| 9,892,014 | B1* | 2/2018 | Hickey | G06F 11/3452 |
| 10,402,113 | B2* | 9/2019 | Ray | G06F 3/0683 |
| 10,430,279 | B1* | 10/2019 | Dittia | G06F 3/0656 |
| 10,789,209 | B2* | 9/2020 | Laker | G06F 16/182 |
| 11,016,683 | B2* | 5/2021 | Ray | G06F 3/0637 |
| 11,314,416 | B1* | 4/2022 | Shveidel | G06F 3/064 |
| 11,709,610 | B2* | 7/2023 | Kim | G11C 16/08 |
| | | | | 711/165 |
| 2004/0210731 | A1 | 10/2004 | Chatterjee et al. | |
| 2006/0059306 | A1* | 3/2006 | Tseng | G06F 11/1096 |
| | | | | 711/170 |
| 2011/0161784 | A1* | 6/2011 | Selinger | G06F 11/1016 |
| | | | | 714/E11.002 |
| 2016/0321008 | A1 | 11/2016 | Fang et al. | |
| 2017/0371587 | A1* | 12/2017 | Saito | G06F 3/0671 |
| 2019/0026039 | A1 | 1/2019 | Wang et al. | |
| 2019/0073265 | A1* | 3/2019 | Brennan | G06F 3/061 |
| 2019/0235777 | A1 | 8/2019 | Wang et al. | |
| 2020/0301829 | A1* | 9/2020 | Somech | G06F 3/0608 |
| 2020/0348857 | A1 | 11/2020 | Kang et al. | |
| 2021/0405908 | A1* | 12/2021 | Bassett | G06F 3/0619 |
| 2022/0019367 | A1* | 1/2022 | Freilich | G06F 3/067 |
| 2022/0382456 | A1* | 12/2022 | Azaria | G06F 3/0622 |
| 2023/0117120 | A1* | 4/2023 | Johnson | G06F 21/552 |
| | | | | 726/22 |
| 2023/0205460 | A1* | 6/2023 | Ishihara | G06F 12/0238 |
| | | | | 711/154 |

FOREIGN PATENT DOCUMENTS

| | | |
|---|---|---|
| CN | 108932256 A | 12/2018 |
| CN | 111831223 A | 10/2020 |
| CN | 111880751 A | 11/2020 |
| CN | 112463050 A | 3/2021 |
| CN | 112764680 A | 5/2021 |
| CN | 112799604 A | 5/2021 |
| CN | 114115729 A | 3/2022 |
| CN | 114217740 A | 3/2022 |
| CN | 114816278 A | 7/2022 |
| JP | 2008046763 A | 2/2008 |

OTHER PUBLICATIONS

Dimitri Pertin et al., "Comparison of RAID-6 Erasure Codes", The third Sino-French Workshop on Information and Communication Technologies, SIFWICT 2015, Jun. 2015 (Year: 2015).*
International Search Report and Written Opinion received for PCT/CN2022/141684 on Mar. 13, 2023, 9 pgs.
Chinese Search Report received or CN Serial No. 2022107598364, on Aug. 8, 2022, 4 pgs.

* cited by examiner

Fig. 1a

| Disk 1 | Disk 2 | Disk 3 | Disk 4 | Disk 5 | Disk 6 |
|--------|--------|--------|--------|--------|--------|
| D1 | D2 | D3 | D4 | P1 | P2 |
| D5 | D6 | P3 | P4 | D7 | D8 |
| P5 | P6 | D9 | D10 | D11 | D12 |
| D13 | D14 | D15 | D16 | P7 | P8 |
| D17 | D18 | P9 | P10 | D19 | D20 |

Newly inserted disk

| Disk 7 | Disk 8 |
|--------|--------|
|  |  |
|  |  |
|  |  |
|  |  |
|  |  |

Fig. 1b

Newly inserted disk

| Disk 1 | Disk 2 | Disk 3 | Disk 4 | Disk 5 | Disk 6 | Disk 7 | Disk 8 |
|--------|--------|--------|--------|--------|--------|--------|--------|
| D1 | D2 | D3 | D4 | D5 | D6 | P1' | P2' |
| D7 | D8 | D9 | D10 | P3' | P4' | D11 | D12 |
| D13 | D14 | P5' | P6' | D15 | D16 | D17 | D18 |
| P7' | P8' | D19 | D20 | | | | |
| | | | | | | | |

Fig. 2

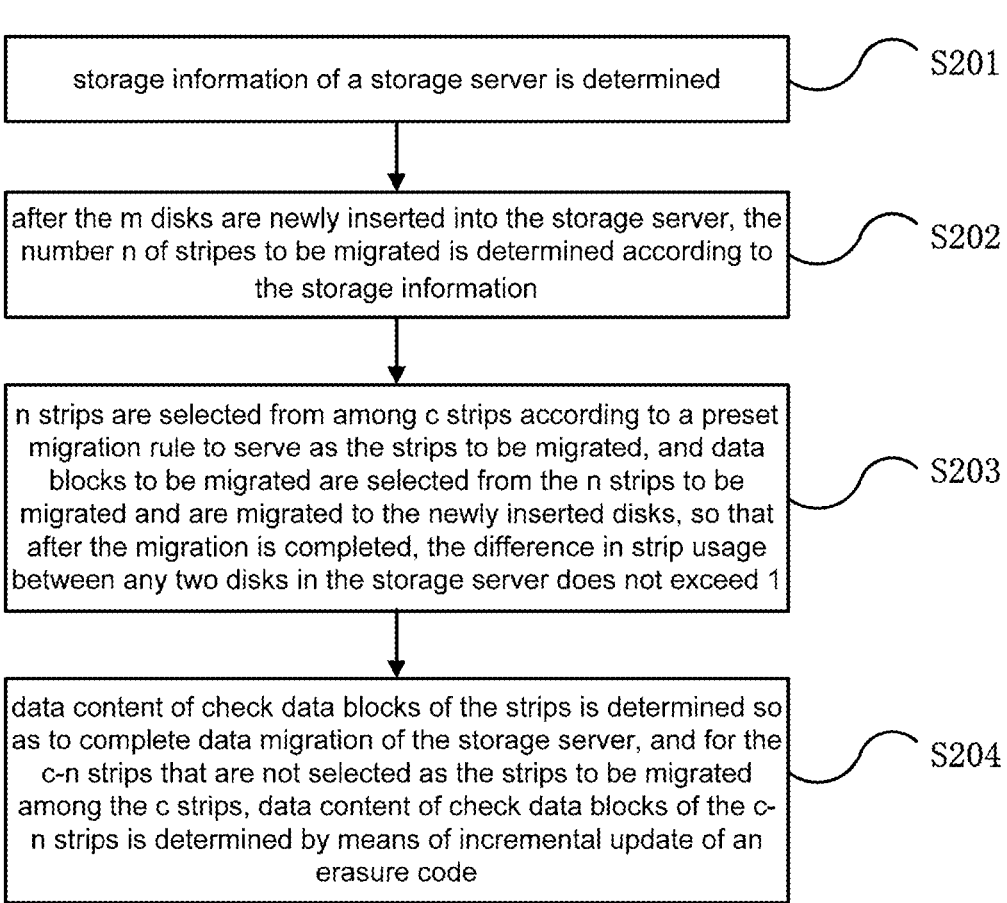

storage information of a storage server is determined     S201 after the m disks are newly inserted into the storage server, the number n of stripes to be migrated is determined according to the storage information     S202 n strips are selected from among c strips according to a preset migration rule to serve as the strips to be migrated, and data blocks to be migrated are selected from the n strips to be migrated and are migrated to the newly inserted disks, so that after the migration is completed, the difference in strip usage between any two disks in the storage server does not exceed 1     S203 data content of check data blocks of the strips is determined so as to complete data migration of the storage server, and for the c-n strips that are not selected as the strips to be migrated among the c strips, data content of check data blocks of the c-n strips is determined by means of incremental update of an erasure code     S204

The number r of disks of the original
storage server is equal to 6 newly inserted
disks

Disk 1   Disk 2   Disk 3   Disk 4   Disk 5   Disk 6       Disk 7   Disk 8

| D1 | D2 | D3 | D4 | P1 | P2 |
| D5 | D6 | P3 | P4 | D7 | D8 |
| P5 | P6 | D9 | D10 | D11 | D12 |
| D13 | D14 | D15 | D16 | P7 | P8 |
| D17 | D18 | P9 | P10 | D19 | D20 |

The number c of
full strips in use by
of the original
storage server

The number
n of strips to
be migrated

The number p of check data blocks of a
single strip

The number m of
newly inserted disks

Newly inserted disk

|  | Disk 1 | Disk 2 | Disk 3 | Disk 4 | Disk 5 | Disk 6 | Disk 7 | Disk 8 |
|---|---|---|---|---|---|---|---|---|
| Strip 1 | D1 | D2 | D3 | D4 | P1 | P2 |  |  |
| Strip 2 | D5 | D6 | P3 | P4 | D7 | D8 |  |  |
| Strip 3 | P5 | P6 | D9 | D10 | D11 | D12 |  |  |
| Strip 4 | D13 | D14 | D15 | D16 | P7 | P8 |  |  |
| Strip 5 | D17 | D18 | P9 | P10 | D19 | D20 |  |  |

Newly inserted disk

|  | Disk 1 | Disk 2 | Disk 3 | Disk 4 | Disk 5 | Disk 6 | Disk 7 | Disk 8 |
|---|---|---|---|---|---|---|---|---|
| Strip 1 | D1 | D2 | D3 | D4 | P1′ | P2′ | D19 | D20 |
| Strip 2 | D5 | D6 | P3′ | P4′ | D7 | D8 | D15 | D16 |
| Strip 3 | P5′ | P6′ | D9 | D10 | D11 | D12 | D17 | D18 |
| Strip 4 | D13 | D14 |  |  |  |  | P7′ | P8′ |
| Strip 5 |  |  |  |  |  |  |  |  |

Storage information determination component — 501

To-be-migrated strip number n determination component — 502

Migration execution component — 503

Check data block update component — 504

601   602

Memory   Processor

DATA MIGRATION METHOD, SYSTEM AND DEVICE FOR STORAGE SERVER, AND NON-TRANSITORY READABLE STORAGE MEDIUM

CROSS-REFERENCE TO RELATED APPLICATION

The present application is a National Stage Application of PCT International Application No.: PCT/CN2022/135156 filed on Nov. 29, 2022, which claims priority to Chinese Patent Application 202210462562.2, filed in the China National Intellectual Property Administration on Apr. 29, 2022, the disclosure of which is incorporated herein by reference in its entirety.

TECHNICAL FIELD

The present disclosure relates to the field of coding technologies, and in particular, to a data migration method, system and device for a storage server, and a non-transitory readable storage medium.

BACKGROUND

At present, distributed storage has been widely used in the face of storage requirements of mass data. There are a large number of nodes in a distributed storage system, the reliability of a single node is usually not very high, and node failures often occur in the system due to reasons such as software and hardware failures and human errors. Therefore, in order to improve data reliability of a distributed storage system and realize reconstruction of an original file, in addition to storing original data, a certain amount of data redundancy is also stored, so that in cases where some nodes fail, the original file can also be decoded and recovered, thereby guaranteeing normal operation of the system.

An EC (Erasure Code) is a forward error correction technology in coding theory, can effectively reduce storage overheads while ensuring the same reliability, and is widely applied to various storage systems and data centers. There are many types of erasure codes, and an RS code (Reed-Solomon Code) is a relatively common type in actual storage systems. The RS code encodes k data blocks into r additional check blocks. The method for obtaining the r check blocks by encoding on the basis of the Vandermonde matrix or the Cauchy matrix is referred to as an RS erasure code encoded by using the Vandermonde matrix or the Cauchy matrix, which can be expressed as:

$$
\begin{bmatrix}
1 & 0 & \cdots & 0 \\
0 & 1 & \cdots & 0 \\
\vdots & \vdots & \vdots & \vdots \\
0 & 0 & \cdots & 1 \\
x_1^0 & x_2^0 & \cdots & x_k^0 \\
\vdots & \vdots & \vdots & \vdots \\
x_1^{r-1} & x_2^{r-1} & \cdots & x_k^{r-1}
\end{bmatrix}
\times
\begin{bmatrix}
D_1 \\
D_2 \\
\vdots \\
D_k
\end{bmatrix}
=
\begin{bmatrix}
D_1 \\
D_2 \\
\vdots \\
D_k \\
P_1 \\
\vdots \\
P_r
\end{bmatrix}
\qquad \text{Formula (1)}
$$

$$
\begin{bmatrix}
1 & 0 & \cdots & 0 \\
0 & 1 & \cdots & 0 \\
\vdots & \vdots & \vdots & \vdots \\
0 & 0 & \cdots & 1 \\
1 & 1 & \cdots & 1 \\
\frac{1}{x_1+y_1} & \frac{1}{x_1+y_2} & \cdots & \frac{1}{x_1+y_k} \\
\vdots & \vdots & \vdots & \vdots \\
1 & 1 & \cdots & 1 \\
\frac{1}{x_r+y_1} & \frac{1}{x_r+y_2} & \cdots & \frac{1}{x_r+y_k}
\end{bmatrix}
\times
\begin{bmatrix}
D_1 \\
D_2 \\
\vdots \\
D_k
\end{bmatrix}
=
\begin{bmatrix}
D_1 \\
D_2 \\
\vdots \\
D_k \\
P_1 \\
\vdots \\
P_r
\end{bmatrix}
\qquad \text{Formula (2)}
$$

Formula (1) represents performing RS encoding by using the Vandermonde matrix, and formula (2) represents performing RS encoding by using the Cauchy matrix. Taking formula (1) as an example, the upper part of the Vandermonde matrix represents a k×k unit matrix. The unit matrix is multiplied by original data $D_1$ to $D_k$, and the obtained result is still the original data $D_1$ to $D_k$. The lower part is an r×k encoding matrix, which is multiplied by the original data $D_1$ to $D_k$, and $P_1$ to $P_r$ obtained are r pieces of encoded data obtained by means of encoding, or referred to as check data. When at most r pieces of data among $D_1$ to $P_r$ are erroneous or lost, the original data $D_1$ to $D_k$ can be obtained by multiplying remaining data by an inverse matrix of a matrix corresponding to the remaining data. For example, when $D_1$ to $D_r$ are lost, the decoding process may be expressed as formula (3).

$$
\begin{bmatrix}
\cdots & 1 & \cdots & 0 \\
\vdots & \vdots & \vdots & \vdots \\
\cdots & 0 & \cdots & 1 \\
\cdots & x_r^0 & \cdots & x_k^0 \\
\vdots & \vdots & \vdots & \vdots \\
\cdots & x_r^{r-1} & \cdots & x_k^{r-1}
\end{bmatrix}^4
\times
\begin{bmatrix}
D_{r+1} \\
D_{r+2} \\
\vdots \\
P_r
\end{bmatrix}
=
\begin{bmatrix}
D_1 \\
D_2 \\
\vdots \\
D_k
\end{bmatrix}
\qquad \text{Formula (3)}
$$

It can be determined that the core of the erasure code is to construct an invertible encoding matrix, and the original encoded data is recovered by using the encoded inverse matrix after encoding. A common RS erasure code uses the Cauchy matrix or the Vandermonde matrix. An obtained matrix is completely invertible, and the expansion of the size of the matrix is simple.

Regardless of distributed storage or unified storage, basic hardware devices are general-purpose storage chips, and the general-purpose storage chips perform storage function control. After construction of storage data is completed and the storage data is protected by means of a redundancy check code, a user needs to perform an operation of newly inserting a disk after the storage server is constructed. In this case, data needs to be migrated without changing a check amount.

SUMMARY

An object of some embodiments of the present disclosure is to provide a data migration method, system and device for a storage server, and a non-transitory readable storage medium.

embodiments of the present disclosure provide the following technical solutions:

a data migration method for a storage server, including:

storage information of a storage server is determined, wherein, the storage information is storage information of the storage server before inserting m disks;

the number n of strips to be migrated is determined according to the storage information, wherein, the strips to be migrated are used to migrate to the m disks which are inserted into the storage server;

n strips are selected from among c strips according to a preset migration rule to serve as the strips to be migrated, and data blocks to be migrated are selected from the n strips to be migrated and are migrated to the disks which are newly inserted, so that after the migration of the data blocks is completed, difference in strip usage between any two disks of the data blocks in the storage server does not exceed 1; and data content of check data blocks of the strips is determined so as to complete data migration of the storage server, and for c-n strips among the c strips that are not selected as the strips to be migrated, determining data content of check data blocks of the c-n strips by means of incremental update of an erasure code, wherein n<c, m, n and c are all positive integers, and c represents the number of full strips in use by of the storage server before the m disks are newly inserted into the storage server.

In some embodiments, determining the storage information of the storage server includes:

the number r of disks, the number c of full strips in use by, and the number p of check data blocks of a single strip before the m disks are newly inserted into the storage server are determined.

In some embodiments, determining the storage information of the storage server includes: a current disk space usage of the storage server and whether storage degradation occurs in the storage server are determined.

In some embodiments, determining the storage information of the storage server further includes: the storage information of the storage server is updated in real time or periodically.

In some embodiments, determining, according to the storage information, the number n of the strips to be migrated includes:

whether the following formula holds or not is determined:

$$\left( \frac{c*m}{r-p+m} - \left\lfloor \frac{c*m}{r-p+m} \right\rfloor \right) * (r-p) > m;$$

in a case that the formula holds, the determined number of the strips to be migrated is:

$$n = \left\lfloor \frac{c*m}{r-p+m} \right\rfloor + 1;$$

and in a case that the formula does not hold, the number of the strips to be migrated which is determined is:

$$n = \left\lfloor \frac{c*m}{r-p+m} \right\rfloor.$$

In some embodiments, selecting the n strips from among the c strips according to the preset migration rule to serve as the strips to be migrated includes:

the n strips with adjacent strip serial numbers are selected from among the c strips to serve as the strips to be migrated.

In some embodiments, selecting the n strips with the adjacent strip serial numbers from among the c strips to serve as the strips to be migrated includes:

the n strips with highest strip serial numbers among the c strips are used as the strips to be migrated.

In some embodiments, the preset migration rule includes: according to a rule that a strip with a high strip serial number takes precedence over a strip with a low strip serial number and when strip serial numbers of two strips are the same, a disk with a high disk serial number to which a data block to be migrated belongs takes precedence over a disk with a low disk serial number to which a data block to be migrated belongs, each data block to be migrated is successively selected from the n strips to be migrated, and is migrated to the disks which are newly inserted; and upon completion of migration of any one of the data blocks to be migrated, in a case that the difference in the strip usage between the any two disks in the storage server does not exceed 1, the migration is completed.

In some embodiments, after determining the storage information of the storage server, the method further includes:

whether a strip that is not fully written exists before the m disks are newly inserted into the storage server is determined;

in a case that the strip that is not fully written does not exist, the operation of determining, according to the storage information, the number n of the strips to be migrated is executed; and in a case that the strip that is not fully written exists, the strip that is not fully written is considered to be an empty strip, and the operation of determining, according to the storage information, the number n of the strips to be migrated is executed.

In some embodiments, after determining the data content of the check data blocks of the strips, the method further includes:

whether a data migration process of the storage server is anomalous is verified, and in a case that the data migration process of the storage server is anomalous, prompt information is outputted.

In some embodiments, verifying whether the data migration process of the storage server is anomalous includes:

whether a total number of user data blocks before the m disks are newly inserted into the storage server is consistent with a total number of user data blocks after the m disks are inserted and data migration is performed is determined, and in a case that the total number of user data blocks before the m disks are newly inserted into the storage server is inconsistent with the total number of user data blocks after the m disks are inserted and data migration is performed, it is determined that the data migration process of the storage server is anomalous.

In some embodiments, after determining that the data migration process of the storage server is anomalous, the method further includes:

an event log of this data migration process is recorded.

In some embodiments, the preset migration rule includes:

for any one of the data blocks to be migrated, a strip in which a check data block with the lowest strip serial number is located in a disk where the data block to be migrated is located before migration is determined, and when the strip has a storage space that is not occupied by any data block to be migrated in the m disks which are newly inserted, the data block to be migrated is migrated to the storage space.

In some embodiments, the storage server is a storage server in a distributed storage system.

In some embodiments, the storage server is a storage server in a unified storage system.

In some embodiments, the check data blocks are arranged in a left-handed misalignment manner.

In some embodiments, the same encoding matrix is used to calculate erasure codes of the strips.

A data migration system of a storage server, including:

a storage information determination component, configured to determine storage information of a storage server;

a to-be-migrated strip number n determination component, configured to determine, according to the storage information, the number n of strips to be migrated after m disks are newly inserted into the storage server;

a migration execution component, configured to select n strips from among c strips according to a preset migration rule to serve as the strips to be migrated, and select, from the n strips to be migrated, data blocks to be migrated and migrate the data blocks to the disks which are newly inserted, so that after migration of the data blocks is completed, difference in strip usage between any two disks of the m disks in the storage server does not exceed 1; and a check data block update component, configured to determine data content of check data blocks of the strips so as to complete data migration of the storage server, and for c-n strips among the c strips that are not selected as the strips to be migrated, determine data content of check data blocks of the c-n strips by means of incremental update of an erasure code, wherein n<c, m, n and c are all positive integers, and c represents the number of full strips in use by of the storage server before the the m disks are newly inserted into the storage server.

A data migration device of a storage server, including:

the memory, configured to store a computer program; and a processor, configured to execute the computer program to implement the steps of the data migration method for a storage server.

A non-transitory readable storage medium, wherein the non-transitory readable storage medium stores a computer program which, when being executed by a processor, implements the steps of the data migration method for a storage server.

By applying the technical solutions provided in the embodiments of the present disclosure, instead of rearranging all data blocks in traditional schemes, the number n of strips to be migrated is determined according to storage information after m disks are newly inserted into a storage server, wherein n<c, and c represents the number of full strips in use by of the storage server before the m disks are newly inserted into the storage server. That is to say, in the solutions of the present disclosure, only a part of the c strips are selected, that is, n strips are selected therefrom for migration. Therefore, for the remaining n-c strips, since user data blocks of these strips in the original disks are not moved, incremental update of an erasure code can be performed only by combining data migrated to the m newly inserted disks. However, the amount of computation of incremental update is small, which is beneficial to improving the data migration efficiency of the storage server in some embodiments of the present disclosure. In addition, in some embodiments of the present disclosure, the n strips are selected from among the c strips according to a preset migration rule to serve as the strips to be migrated, and data blocks to be migrated are selected from the n strips to be migrated and are migrated to the disks which are newly inserted, so that after the migration is completed, the difference in strip usage between any two disks in the storage server does not exceed 1. That is to say, the determination of the value of the number n of strips to be migrated and the setting of the preset migration rule can satisfy the requirements of load balancing. In addition, since only data migration of n strips is involved, the data migration amount is also lower than that in the traditional solutions, which is also beneficial to improving the data migration efficiency.

In conclusion, the solutions in some embodiments of the present disclosure can effectively perform data migration of a storage server, ensuring load balancing, and can improve data migration efficiency.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Apparently, the accompanying drawings in the following description merely relate to some embodiments of the present disclosure, and for a person of ordinary skill in the art, other embodiments can also be derived from these accompanying drawings without involving any inventive effort.

FIG. 1a is a schematic diagram of inserting new disks into a general-purpose storage server in which an erasure group has been constructed in the traditional solutions;

FIG. 1b is a schematic diagram of a migration result after data migration is performed in the case of FIG. 1a in the traditional solutions;

FIG. 2 is an implementation flowchart of a data migration method for a storage server according to embodiments of the present disclosure;

DETAILED DESCRIPTION OF THE EMBODIMENTS

Figure 3:
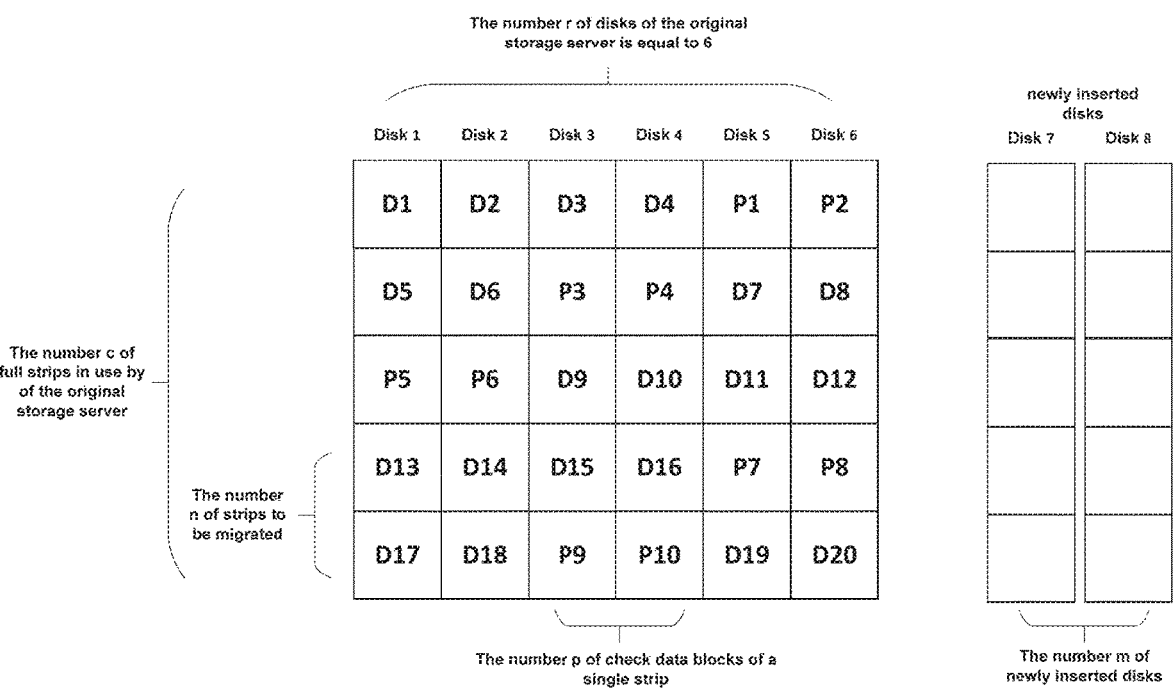
FIG. 3 is a schematic diagram of a storage server and determined storage information according to specific embodiments of the present disclosure.

The core of the present disclosure is to provide a data migration method for a storage server, which can effectively perform data migration of the storage server, ensuring load balancing, and can improve data migration efficiency.

To make a person skilled in the art better understand the solutions of the present disclosure, hereinafter, some embodiments of the present disclosure are further described in detail with reference to the accompanying drawings and specific embodiments. Apparently, the embodiments as described are merely some rather than all of the embodiments of the present disclosure. All other embodiments obtained by a person of ordinary skill in the art on the basis of the embodiments of the present disclosure without involving any inventive effort all fall within the scope of protection of the present disclosure.

Please refer to FIG. 2, FIG. 2 is an implementation flowchart of a data migration method for a storage server according to embodiments of the present disclosure. The data migration method for a storage server may include the following steps:

Step S201: storage information of a storage server is determined.

Specifically, specific items of the storage information that need to be determined may be set and adjusted according to requirements; however, it should be understood that the determined storage information of the storage server should enable that the number n of strips to be migrated can be determined according to the storage information in subsequent steps.

For example, in specific embodiments of the present disclosure, step S201 may specifically include:

the number r of disks, the number c of full strips in use by, and the number p of check data blocks of a single strip before m disks are newly inserted into the storage server are determined.

In the embodiments, only three storage parameters of the storage server need to be determined, and subsequently, the number n of strips to be migrated can be determined according to the three storage parameters, thereby facilitating implementation. Certainly, in some other embodiments, the determined storage information may include more content. For example, in a specific case, the current disk space usage of the storage server, whether storage degradation occurs, etc. may also be determined according to requirements.

It should be noted that, step S201 may usually be executed in real time or periodically, that is, the storage information of the storage server is updated in real time or periodically. Therefore, whenever the storage information of the storage server is determined, the determined r is the current number of disks of the storage server, the determined c is the current number of full strip usages of the storage server, and the determined p is the current number of check data blocks of a single strip of the storage server.

Step S202: after the m disks are newly inserted into the storage server, the number n of strips to be migrated is determined according to the storage information.

After the m disks are newly inserted into the storage server, in some embodiments of the present disclosure, data migration will be performed to ensure load balancing. In some embodiments of the present disclosure, not all user data blocks are migrated, but the number n of strips to be migrated is determined, and subsequently, only data blocks to be migrated are selected from the n strips to be migrated for migration. That is to say, for the original r disks of the storage server, user data blocks in the c-n strips do not need to be migrated.

Wherein, n is a positive integer less than c, and since load balancing needs to be ensured subsequently after migration, n is a known value to be determined. That is, after the storage information of the storage server and the number m of newly inserted disks are determined, in order to achieve load balancing after data migration, i.e. in order to satisfy that "after the migration is completed, the difference in strip usage between any two disks in the storage server does not exceed 1", the number n of strips to be migrated is a definite value.

Certainly, there are a plurality of specific calculation methods for determining the number n of strips to be migrated. For example, in specific embodiments of the present disclosure, determining the number n of strips to be migrated according to the storage information described in step S202 may specifically include:

Whether $$\left( \frac{c*m}{r-p+m} - \left\lfloor \frac{c*m}{r-p+m} \right\rfloor \right) * (r-p) > m$$

holds or not is determined;

if so, the determined number of strips to be migrated is $$n = \left\lfloor \frac{c*m}{r-p+m} \right\rfloor + 1;$$

and if not, the determined number of strips to be migrated is $$n = \left\lfloor \frac{c*m}{r-p+m} \right\rfloor.$$

For ease of understanding, taking FIG. 3 as an example, before the m disks are newly inserted into the storage server, the number r of disks is 6, the number m of newly inserted disks is 2, the number p of check data blocks of a single strip is 2, and the number c of full strips in use by is 5.

It should be emphasized that, c represents the number of full strips in use by. Assuming that in addition to the existing five full strips in FIG. 3, there is another strip 6 that is not fully written, then the strip that is not fully written does not participate in computation, and this situation rarely occurs in actual construction of storage servers.

In the embodiments of FIG. 3, c×m=5×2=10, which represents the storage space, i.e. the number of chunks, in the newly inserted disks (same as the disks which are newly inserted), i.e. the 10 blank cells in FIG. 3. Since p=2, (c×m)/(r−p+m)=10/6=1.67, the rounding down result for 1.67 is 1, and 1.67−1=0.67. Finally, it is determined whether 0.67×(6−2) is greater than m, and since 0.67×(6−2)=2.68 and 2.68 is greater than 2, the determined number of strips to be migrated is $$n = \left\lfloor \frac{c*m}{r-p+m} \right\rfloor + 1;$$

that is, n=1+1=2. That is to say, for the embodiments of FIG. 3, the determined number of strips to be migrated is 2.

Step S203: n strips are selected from among c strips according to a preset migration rule to serve as the strips to be migrated, and data blocks to be migrated are selected from the n strips to be migrated and are migrated to the newly inserted disks, so that after the migration is completed, the difference in strip usage between any two disks in the storage server does not exceed 1.

After the number n of strips to be migrated is determined, n strips need to be selected from among the c strips to serve as the strips to be migrated. The strips may be selected according to a preset migration rule, and a specific selection manner may be set according to requirements. It should be noted that theoretically, randomly selecting n strips from among the c strips to serve as the strips to be migrated does not affect the implementation of the present disclosure.

Further, in specific embodiments of the present disclosure, selecting the n strips from among the c strips according to the preset migration rule to serve as the strips to be migrated described in step S203 may specifically include:

n strips with adjacent strip serial numbers are selected from among the c strips to serve as the strips to be migrated.

As described above, theoretically, randomly selecting n strips from among the c strips to serve as the strips to be migrated does not affect the implementation of the present disclosure. However, in the embodiments, it is further considered that when n strips are selected as the strips to be migrated, the selection methods are different. When executing "selecting, from the n strips to be migrated, data blocks to be migrated and migrating the data blocks to the newly inserted disks" in step S203, the program needs to be designed adaptively. If n strips with adjacent strip serial numbers are selected from among the c strips to serve as the strips to be migrated, compared with selecting n strips at intervals, program design may be more convenient and less prone to errors. Therefore, in the embodiments, the preset migration rule includes: selecting n strips with adjacent strip serial numbers from among the c strips to serve as the strips to be migrated.

Further, in specific embodiments of the present disclosure, selecting the n strips with adjacent strip serial numbers from among the c strips to serve as the strips to be migrated specifically includes:

n strips with the highest strip serial numbers among the c strips are used to serve as the selected strips to be migrated. Wherein, n strips with the highest strip serial numbers are n strips among the c strips which's strip serial numbers are all higher than strip serial numbers of other strips among the c strips, and the other strips refer to the strips excluding n strips from the c strips.

Figure 4:
FIG. 4 is a schematic diagram of a migration result according to specific embodiments of the present disclosure.

In the embodiments, it is further considered that n strips with the highest strip serial numbers among the c strips are used as the selected strips to be migrated. Reference can be made to FIG. 4, it is equivalent to moving data in the lower part upward, and subsequently, it can be conveniently determined whether the trigger condition "the difference in strip usage between any two disks in the storage server does not exceed 1" for ending the migration is met, and it is also convenient to design a migration rule. That is, since the n strips with the highest strip serial numbers are used as the selected strips to be migrated, migration may be performed row by row from bottom to top subsequently, so that program design is less prone to errors and the design is convenient, thereby facilitating implementation.

After the n strips to be migrated are selected, data blocks to be migrated can be selected, according to a preset migration rule, from the n strips to be migrated and migrated to the newly inserted disks. The specific methods for selecting the data blocks to be migrated may be arbitrarily set, and even if the data blocks are randomly selected, the implementation of the present disclosure is not affected. Certainly, in practical applications, selecting in order is less prone to errors, and since the addresses of the data blocks need to be adjusted after the migration, the data blocks to be migrated are usually selected according to a set order, so as to be migrated to the m newly inserted disks.

For example, in some optional embodiments of the present disclosure, the preset migration rule may specifically include:

according to the rule that a high strip serial number takes precedence over a low strip serial number and when the strip serial numbers are the same, a high disk serial number to which a data block to be migrated belongs takes precedence over a low disk serial number, each data block to be migrated is successively selected from the n strips to be migrated, and migrated same to the newly inserted disks; and after migration of any one of the data blocks to be migrated is completed, if it holds that the difference in strip usage between any two disks in the storage server does not exceed 1, the migration being completed.

As described above, in the embodiments, it is considered that n strips with the highest strip serial numbers among the c strips are used as the selected strips to be migrated. Therefore, in order to perform orderly migration, migration is performed according to the rule that a high strip serial number takes precedence over a low strip serial number, so that the data blocks to be migrated can be selected in order and the addresses can be adjusted in order. It should be noted that the data blocks to be migrated are all user data blocks, and the check data blocks do not need to be migrated, and only need to be updated or deleted.

When the strip serial numbers are the same, in the embodiments, the data blocks to be migrated are selected according to the rule that a high disk serial number to which a data block to be migrated belongs takes precedence over a low disk serial number.

Upon completion of migration of any one of the data blocks to be migrated, if the condition "the difference in strip usage between any two disks in the storage server does not exceed 1" holds, further migration is not required, and only the check data blocks need to be updated subsequently to complete the process.

Step S204: data content of check data blocks of the strips is determined so as to complete data migration of the storage server, and for the c-n strips that are not selected as the strips to be migrated among the c strips, data content of check data blocks of the c-n strips is determined by means of incremental update of an erasure code.

For the c-n strips that are not selected as the strips to be migrated among the c strips, user data blocks of the original r disks of the storage server in the c-n strips are not migrated. Therefore, according to a computation rule of the erasure code, it can be determined that for the c-n strips, the data content of the check data blocks of the c-n strips can be determined by means of incremental update of the erasure code, and the amount of computation of the incremental update method is small.

In some embodiments of the present disclosure, the preset migration rule includes:

for any one of the selected data blocks to be migrated, a strip in which a check data block with the lowest strip serial number is located in a disk where the data block to be migrated is located before migration is determined, and when the strip has a storage space that is not occupied by any data block to be migrated in the m newly inserted disks, the data block is migrated to be migrated to the storage space.

For ease of description, FIG. 4 is still taken as an example. For example, n strips with the highest strip serial numbers among the c strips are used as the selected strips to be migrated, and the data blocks to be migrated are selected, for example, according to the rule that a high strip serial number takes precedence and a high disk serial number takes precedence when the strip serial numbers are the same in the foregoing embodiments.

In the embodiments, a position limitation is imposed on placement of the data blocks to be migrated into the m newly inserted disks, which is beneficial to improving computation efficiency of updating the erasure code.

In some embodiments, in the embodiments of FIG. 4, according to the described preset migration rule, first D20 and then D19 are used as the selected data blocks to be migrated. For the user data block D20, a disk where the data block to be migrated is located is a disk 6, a check data block with the lowest strip serial number in the disk 6 is P2, and a strip in which P2 is located is a strip 1. In the strip 1, two data block spaces exist in two newly inserted disks, and are not occupied by any data blocks to be migrated. Therefore, the data block D20 to be migrated may be migrated to the strip 1 in a disk 7 or a disk 8. For example, in the case shown in FIG. 4, the data block D20 to be migrated is migrated to the strip 1 in the disk 8.

After migration of D20 is completed, D19 is used as the selected data block to be migrated. A disk where D19 is located is a disk 5, a check data block with the lowest strip serial number in the disk 5 is P1, and a strip in which P1 is located is the strip 1. In this case, in the strip 1, only one data block space exists in the two newly inserted disks that is not occupied by any data block to be migrated. Therefore, the data block D19 to be migrated may be migrated to the strip 1 in the disk 7.

After migration of D19 is completed, D18 and D17 are successively used as the selected data blocks to be migrated. According to the same rule, D18 corresponds to P6, then D18 is migrated to a strip 3 in the disk 8; and D17 corresponds to P5, then D17 is migrated to the strip 3 in the disk 7.

Finally, D16 and D15 are used as the selected data blocks to be migrated. D16 corresponds to P4, then D16 is migrated to a strip 2 in the disk 8; and D15 corresponds to P3, then D15 is migrated to the strip 2 in the disk 7. After migration of D15 is completed, the condition "the difference in strip usage between any two disks in the storage server does not exceed 1" holds, and therefore, the remaining D13 and D14 do not need to be migrated.

Since parameters of an RS (Reed-Solomon) code or RAID (Redundant Array of Independent Disks) algorithm, when implementing a storage erasure coding function, are determined on the basis of location information, for the requirements of any k data blocks and r check blocks, a general algorithm relation of erasure codes may be summarized as:

$$P1 = a_{1,1}D1 \oplus a_{1,2}D2 \oplus \ldots \oplus a_{1,k}D_k$$

$$\ldots$$

$$Pr = a_{r,1}D1 \oplus a_{r,2}D2 \oplus \ldots \oplus a_{r,k}D_k.$$

The parameter items $a_{1,1}$ to $a_{r,k}$ may be, for example, selected from the encoding matrix of the Vandermonde matrix in formula (1) or the encoding matrix of the Cauchy matrix in formula (2) above.

Specifically, in the embodiments of FIG. 4, before the m disks are newly inserted into the storage server, P1 and P2 may be expressed as:

$$P1 = a_{1,1}D1 \oplus a_{1,2}D2 \oplus a_{1,3}D3 \oplus a_{1,4}D4$$

$$P2 = a_{2,1}D1 \oplus a_{2,2}D2 \oplus a_{2,3}D3 \oplus a_{2,4}D4.$$

After migration according to the embodiments of FIG. 4, P1' and P2' may be expressed as:

$$P1' = a_{1,1}D1 \oplus a_{1,2}D2 \oplus a_{1,3}D3 \oplus a_{1,4}D4 \oplus a_{1,5}D19 \oplus a_{1,6}D20$$

$$P2' = a_{2,1}D1 \oplus a_{2,2}D2 \oplus a_{2,3}D3 \oplus a_{2,4}D4 \oplus a_{2,5}D19 \oplus a_{2,6}D20.$$

That is, $$P1' = P1 \oplus a_{1,5}D19 \oplus a_{1,6}D20$$

$$P2' = P2 \oplus a_{2,5}D19 \oplus a_{2,6}D20.$$

Therefore, it can be determined that incremental update of the erasure code in the strip 1 can be completed by means of original P1 and P2 in combination with D19 and D20. Both P1 and D19 are from a disk 5, and both P2 and D20 are from a disk 6; therefore, four data blocks required for performing incremental update of an erasure code in the strip 1 can be read from only two disks. Compared with the manner of reading four data blocks from four different disks, this is beneficial to reducing data reading time consumption, and is also beneficial to improving computation efficiency of updating the erasure code.

In addition, the storage server in some embodiments of the present disclosure may be applicable to unified storage, and may also be applicable to distributed storage. Especially in distributed storage, i.e. when the storage server is a storage server in a distributed storage system, cross-node data reading takes a longer time, and is prone to errors. In the embodiments, required data is read from the same disk as much as possible, so that the probability of cross-node data reading is reduced, and the advantage is more obvious.

In addition, RS encoding uses a Galois field (GF). Therefore, the described is addition in the Galois field, which is usually represented as Exclusive OR in computers.

Similarly, in the embodiments of FIG. 4, before the m disks are newly inserted into the storage server, P3 and P4 may be expressed as:

$$P3 = a_{1,1}D5 \oplus a_{1,2}D6 \oplus a_{1,3}D7 \oplus a_{1,4}D8$$

$$P4 = a_{2,1}D5 \oplus a_{2,2}D6 \oplus a_{2,3}D7 \oplus a_{2,4}D8.$$

After migration according to the embodiments of FIG. 4, P3' and P4' may be expressed as:

$$P3' = a_{1,1}D5 \oplus a_{1,2}D6 \oplus a_{1,3}D7 \oplus a_{1,4}D8 \oplus a_{1,5}D15 \oplus a_{1,6}D16 =$$

$$P3 \oplus a_{1,5}D15 \oplus a_{1,6}D16$$

$$P4' = a_{2,1}D5 \oplus a_{2,2}D6 \oplus a_{2,3}D7 \oplus a_{2,4}D8 \oplus a_{2,5}D15 \oplus a_{2,6}D16 =$$

$$P4 \oplus a_{2,5}D15 \oplus a_{2,6}D16.$$

Therefore, it can be determined that incremental update of the erasure code in the strip 2 can be completed by means of original P3 and P4 in combination with D15 and D16. Similarly, P3 and D15 are both from a disk 3, and P4 and D16 are both from a disk 4, which is beneficial to reducing data reading time consumption, and is also beneficial to improving computation efficiency of updating the erasure code.

In addition, in the embodiments of FIG. 4, since there is still data in the strip 4, that is, D13 and D14 have not been migrated, data content of check data blocks of the strip also needs to be determined. Since the check data blocks in FIG. 4 are arranged in a left-handed misalignment manner for the strip 4, the determined check data blocks P7' and P8' may be expressed as:

$$P7' = a_{1,1}D13 \oplus a_{1,2}D14$$

$$P8' = a_{2,1}D13 \oplus a_{2,2}D14,$$

and are placed in the disk 7 and the disk 8. In other cases, the check data blocks may also be arranged in manners other than the left-handed misalignment manner, which does not affect the implementation of the present disclosure.

In addition, it should be noted that, when the erasure codes of the strips are calculated, the same encoding matrix may be used, and different encoding matrices may also be used. Certainly, in practical applications, the same encoding matrix is usually used.

In some embodiments of the present disclosure, after determining the storage information of the storage server, the method may further include:

whether a strip that is not fully written exists before the m disks are newly inserted into the storage server is determined;

if not, the operation of determining, according to the storage information, the number n of strips to be migrated is executed; and if so, the strip that is not fully written is considered to be an empty strip, and the operation of determining, according to the storage information, the number n of strips to be migrated is executed.

As described above, c in some embodiments of the present disclosure represents the number of full strips in use by. Taking FIG. 3 as an example, assuming that in addition to the existing five full strips in FIG. 3, there is another strip 6 that is not fully written, then the strip that is not fully written does not participate in computation. Although this situation rarely occurs in actual construction of storage servers, in the embodiments, considering the occurrence of this case, in order to avoid anomalies in execution of the solutions of the present disclosure, after existence of the strip that is not fully written is determined, the strip that is not fully written is considered to be an empty strip, and then the operation in step S201 is performed.

The strip that is not fully written is considered to be an empty strip, and thus the strip can also be directly ignored, and any data block in the strip is not moved. Certainly, when it is subsequently determined whether "the difference in strip usage between any two disks in the storage server does not exceed 1" holds, the strip is also considered to be an empty strip.

In some embodiments of the present disclosure, after step S204, the method may further include:

whether a data migration process of the storage server is anomalous is verified, and if so, prompt information are output.

In the embodiments, whether a data migration process of the storage server is anomalous is verified, thereby improving the reliability of the solutions of the present disclosure. That is, by means of the outputted prompt information, an anomalous situation can be found as early as possible, so that repair is performed early, thereby avoiding aggravation of the fault situation.

There may also be a plurality of methods for verifying whether the data migration process of the storage server is anomalous. For example, In some embodiments of the present disclosure, verifying whether the data migration process of the storage server is anomalous may specifically include:

whether the total number of user data blocks before the m disks are newly inserted into the storage server is consistent with the total number of user data blocks after the m disks are inserted and data migration is performed is determined, and if not, determining that the data migration process of the storage server is anomalous.

In the embodiments, it is considered that the total number of user data blocks before the m disks are newly inserted into the storage server should be consistent with the total number of user data blocks after the m disks are inserted and data migration is performed, and if not, it can be determined that the data migration process of the storage server is anomalous. For example, due to reasons such as a communication fault and several poor contacts in the m newly inserted disks, a part of the user data blocks are not successfully migrated to the newly inserted disks.

In the embodiments, it is convenient to determine whether a data migration process of a storage server is anomalous according to whether the total number of user data blocks is consistent, because verification of the total number of user data blocks takes a very short time, and also does not occupy excessive resources.

Further, after determining that the data migration process of the storage server is anomalous, the method may further include:

an event log of this data migration process is recorded, so as to assist staff in handling an anomalous event, causes of anomalies are analyzed, and then corresponding countermeasures are adopted, so as to avoid or reduce the probability of such anomalies occurring again subsequently.

By applying the technical solutions provided in the embodiments of the present disclosure, instead of rearranging all data blocks in traditional schemes, the number n of strips to be migrated is determined according to storage information after m disks are newly inserted into a storage server, wherein n<c, and c represents the number of full strips in use by of the storage server before the m disks are newly inserted into the storage server. That is to say, in the solutions of the present disclosure, only a part of the c strips are selected, that is, n strips are selected therefrom for migration. Therefore, for the remaining n-c strips, since user data blocks of these strips in the original disks are not moved, incremental update of an erasure code can be performed only by combining data migrated to the m newly inserted disks. However, the amount of computation of incremental update is small, which is beneficial to improving the data migration efficiency of the storage server in some embodiments of the present disclosure. In addition, in some embodiments of the present disclosure, the n strips are selected from among the c strips according to a preset migration rule to serve as the strips to be migrated, and data blocks to be migrated are selected from the n strips to be migrated and are migrated to the newly inserted disks, so that after the migration is completed, the difference in strip usage between any two disks in the storage server does not exceed 1. That is to say, the determination of the value of the number n of strips to be migrated and the setting of the preset migration rule can satisfy the requirements of load balancing. In addition, since only data migration of n strips is involved, the data migration amount is also lower than that in the traditional solutions, which is also beneficial to improving the data migration efficiency.

In conclusion, the solutions in some embodiments of the present disclosure can effectively perform data migration of a storage server, ensuring load balancing, and can improve data migration efficiency.

Corresponding to the foregoing method embodiments, the embodiments of the present disclosure further provide a data migration system of a storage server, and reference may be made to the text above.

Figure 5:
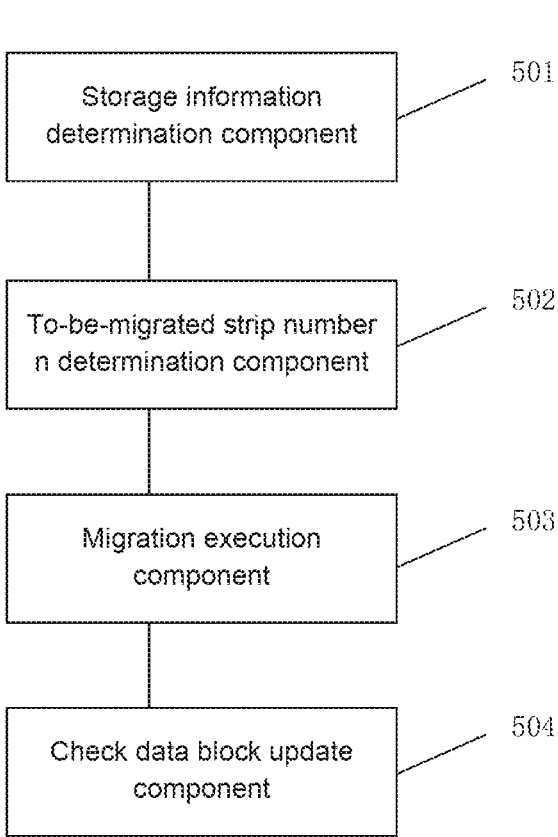
FIG. 5 is a schematic structural diagram of a data migration system of a storage server according to embodiments of the present disclosure.

Reference can be made to FIG. 5, which is a schematic structural diagram of a data migration system of a storage server according to embodiments of the present disclosure, including:

a storage information determination component 501, configured to determine storage information of a storage server;
  a to-be-migrated strip number n determination component 502, configured to determine, according to the storage information, the number n of strips to be migrated after m disks are newly inserted into the storage server;
  a migration execution component 503, configured to select n strips from among c strips according to a preset migration rule to serve as the strips to be migrated, and select, from the n strips to be migrated, data blocks to be migrated and migrating the data blocks to the newly inserted disks, so that after the migration is completed, the difference in strip usage between any two disks in the storage server does not exceed 1; and
  a check data block update component 504, configured to determine data content of check data blocks of the strips so as to complete data migration of the storage server, and for the c-n strips among the c strips that are not selected as the strips to be migrated, determine data content of check data blocks of the c-n strips by means of incremental update of an erasure code,
  wherein n<c, m, n and c are all positive integers, and c represents the number of full strips in use by of the storage server before the m disks are newly inserted into the storage server.

In some embodiments of the present disclosure, the storage information determination component 501 is specifically configured to:

determine the number r of disks, the number c of full strips in use by, and the number p of check data blocks of a single strip before the m disks are newly inserted into the storage server.

The to-be-migrated strip number n determination component 502 is specifically configured to:

determine whether $$\left( \frac{c*m}{r-p+m} - \left\lfloor \frac{c*m}{r-p+m} \right\rfloor \right) * (r-p) > m$$

holds or not;

if so, the determined number of strips to be migrated being $$n = \left\lfloor \frac{c*m}{r-p+m} \right\rfloor + 1;$$

and if not, the determined number of strips to be migrated being $$n = \left\lfloor \frac{c*m}{r-p+m} \right\rfloor.$$

16

In some embodiments of the present disclosure, selecting the n strips from among the c strips according to the preset migration rule to serve as the strips to be migrated includes:

selecting n strips with adjacent strip serial numbers from among the c strips to serve as the strips to be migrated.

In some embodiments of the present disclosure, selecting the n strips with adjacent strip serial numbers from among the c strips to serve as the strips to be migrated includes:

using n strips with the highest strip serial numbers among the c strips to serve as the selected strips to be migrated.

In some embodiments of the present disclosure, the preset migration rule includes:

according to the rule that a high strip serial number takes precedence over a low strip serial number and when the strip serial numbers are the same, a high disk serial number to which a data block to be migrated belongs takes precedence over a low disk serial number, successively selecting each data block to be migrated from the n strips to be migrated, and migrating same to the newly inserted disks; and
  upon completion of migration of any one of the data blocks to be migrated, if it holds that the difference in strip usage between any two disks in the storage server does not exceed 1, the migration being completed.

In some embodiments of the present disclosure, after the storage information determination component 501 determines the storage information of the storage server, a first determination component is further included, which is configured to:

determine whether a strip that is not fully written exists before the m disks are newly inserted into the storage server;
  if not, trigger the to-be-migrated strip number n determination component 502; and
  if so, consider the strip that is not fully written to be an empty strip, and trigger the to-be-migrated strip number n determination component 502.

In some embodiments of the present disclosure, after the check data block update component 504 determines the data content of the check data blocks of the strips, a verification component is further included, which is configured to:

verify whether a data migration process of the storage server is anomalous, and if so, output prompt information.

In some embodiments of the present disclosure, the verification component is specifically configured to:

determine whether the total number of user data blocks before the m disks are newly inserted into the storage server is consistent with the total number of user data blocks after the m disks are inserted and data migration is performed, and if not, determine that the data migration process of the storage server is anomalous, and output prompt information.

In some embodiments of the present disclosure, the verification component is further configured to:

record an event log of this data migration process.

In some embodiments of the present disclosure, the preset migration rule includes:

for any one of the selected data blocks to be migrated, determining a strip in which a check data block with the lowest strip serial number is located in a disk where the data block to be migrated is located before migration, and when the strip has a storage space that is not occupied by any data block to be migrated in the m newly inserted disks, migrating the data block to be migrated to the storage space.

In some embodiments of the present disclosure, the storage server is a storage server in a distributed storage system.

Figure 6:
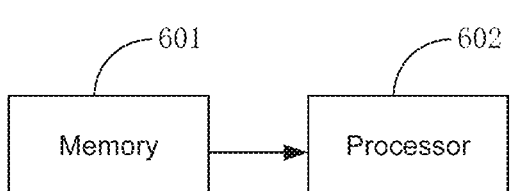
FIG. 6 is a schematic structural diagram of a data migration device of a storage server according to embodiments of the present disclosure.

Corresponding to the foregoing method and system embodiments, the embodiments of the present disclosure further provide a data migration device of a storage server and a none-transitory readable storage medium. Reference can be made to FIG. 6, the data migration device of the storage server may include:

a memory 601, configured to store a computer program; and a processor 602, configured to execute the computer program to implement the steps of the data migration method for a storage server according to any one of the embodiments above.

The non-transitory readable storage medium stores a computer program which, when being executed by a processor, implements the steps of the data migration method for a storage server according to any one of the embodiments above. The non-transitory readable storage medium described herein includes a random access memory (RAM), a memory, a read-only memory (ROM), an electrically programmable ROM, an electrically erasable programmable ROM, a register, a hard disk, a removable disk, a CD-ROM, or any other form of storage medium known in the art.

It should also be noted that in the present text, relational terms such as first and second are only used to distinguish one entity or operation from another entity or operation, and do not necessarily require or imply any actual relationship or sequence between these entities or operations. Furthermore, the terms "include", "including", or any other variations thereof are intended to cover a non-exclusive inclusion, so that a process, a method, an article, or a device that includes a series of elements not only includes those elements, but further includes other elements that are not explicitly listed, or further includes inherent elements of the process, the method, the article, or the device. Without further limitation, an element defined by a sentence "including a . . . " does not exclude other same elements existing in the process, the method, the article, or the device that includes the element.

A professional would have been aware that the units and the steps of the algorithm described in conjunction with the embodiments disclosed herein may be directly implemented by hardware, by a computer software, or by a combination thereof. To clearly describe the interchangeability of hardware and software, the description above has generally described compositions and steps of each example according to functions. Whether the functions are executed by hardware or software depends on specific applications and design constraint conditions of the technical solutions. A person skilled in the art may use different methods to implement the described functions for each specific application, but such implementation should not be considered as going beyond the scope of the present disclosure.

The principle and embodiments of the present disclosure are described herein through specific examples, and the illustration of the embodiments above is only used to help understand the technical solutions and core ideas of some embodiments of the present disclosure. It should be pointed out that for a person of ordinary skill in the technical field, several improvements and refinements can be made without departing from the principle of the present disclosure, and these improvements and refinements shall also fall within the scope of protection of the present disclosure.

What is claimed is:

1. A data migration method for a storage server, comprising:

determining storage information of a storage server, wherein, the storage information is storage information of the storage server before inserting m disks;

determining, according to the storage information, the number n of strips to be migrated, wherein, the strips to be migrated are used to migrate to the m disks which are inserted into the storage server;

selecting n strips from among c strips according to a preset migration rule to serve as the strips to be migrated, and selecting, from the n strips to be migrated, data blocks to be migrated and migrating the data blocks from an original disk where the data blocks to be migrated is located to the disks which are newly inserted, so that after migration of the data blocks is completed, difference in strip usage between any two disks of the m disks in the storage server does not exceed 1, wherein the preset migration rule comprises: for any one of the data blocks to be migrated, determining a strip in which a check data block with the lowest strip serial number is located in a disk where the data block to be migrated is located before migration, and when the strip has a storage space that is not occupied by any data block to be migrated in the m disks which are newly inserted, migrating the data block to be migrated to the storage space, thereby a position limitation is imposed on placement of the data blocks to be migrated into the m newly inserted disks, so as to satisfy the requirements of load balancing; and determining data content of check data blocks of the strips so as to complete data migration of the storage server, and for c-n strips among the c strips that are not selected as the strips to be migrated, determining data content of check data blocks of the c-n strips by means of incremental update of an erasure code, user data blocks of the c-n strips which are remaining in original disks are not moved, so as to perform incremental update of the erasure code by combining data migrated to the m newly inserted disks, a type of the erasure code is Reed-Solomon Code (RS code) used for encoding k data blocks into r additional check blocks, parameters of the RS code, when implementing a storage erasure coding function, are determined on the basis of location information, a general algorithm relation of the erasure codes is summarized as:

$$P1 = a_{1,1}D1 \oplus a_{1,2}D2 \oplus \ldots \oplus a_{1,k}D_k$$

$$\ldots$$

$$Pr = a_{r,1}D1 \oplus a_{r,2}D2 \oplus \ldots \oplus a_{r,k}D_k,$$

wherein, $a_{1,1}$ to $a_{r,k}$ are selected from an encoding matrix of a Vandermonde matrix or an encoding matrix of a Cauchy matrix, P1 to Pr are check data blocks, D1 to Dk are user data blocks, $\oplus$ is addition in the Galois field, determining whether a total number of user data blocks before the m disks are newly inserted into the storage server is consistent with a total number of user data blocks after the m disks are inserted and data migration is performed, and in a case that the total number of user data blocks before the m disks are newly inserted into the storage server is inconsistent with the total number of user data blocks after the m disks are inserted and data migration is performed, determining a part of the user data blocks is not successfully migrated to the newly inserted disks, wherein n<c, m, n and c are all positive integers, and c represents the number of full strips in use by of the storage server before the m disks are newly inserted into the storage server, wherein selecting the n stripes from among the c stripes according to the preset migration rule to serve as the stripes to be migrated comprises:

using the n strips with highest strip serial numbers among the c strips to serve as the strips to be migrated, wherein the preset migration rule further comprises:

according to a rule that a stripe with a high stripe serial number takes precedence over a stripe with a low stripe serial number and when stripe serial numbers of two stripes are the same, a disk with a high disk serial number to which a data block to be migrated belongs takes precedence over a disk with a low disk serial number to which a data block to be migrated belongs, successively selecting each data block to be migrated from the n stripes to be migrated, and migrating same to the disks which are newly inserted; and upon completion of migration of any one of the data blocks to be migrated, in a case that the difference in the stripe usage between the any two disks in the storage server does not exceed 1, determining the migration being completed.

2. The data migration method for the storage server according to claim 1, wherein determining the storage information of the storage server comprises:

determining a number r of disks, the number c of the full strips in use by the storage server, and a number p of check data blocks of a single strip before the m disks are newly inserted into the storage server.

3. The data migration method for the storage server according to claim 1, wherein determining the storage information of the storage server comprises:

determining a current disk space usage of the storage server and whether storage degradation occurs in the storage server.

4. The data migration method for the storage server according to claim 1, wherein determining the storage information of the storage server further comprises:

updating the storage information of the storage server in real time or periodically.

5. The data migration method for the storage server according to claim 2, wherein determining, according to the storage information, the number n of the strips to be migrated comprises:

determining whether the following formula holds or not:

$$\left( \frac{c*m}{r-p+m} - \left\lfloor \frac{c*m}{r-p+m} \right\rfloor \right) * (r-p) > m;$$

in a case that the following formula holds, the number of the strips to be migrated which is determined being:

$$n = \left\lfloor \frac{c*m}{r-p+m} \right\rfloor + 1;$$

in a case that the following formula not holds, the number of the strips to be migrated which is determined being:

$$n = \left\lfloor \frac{c*m}{r-p+m} \right\rfloor.$$

6. The data migration method for the storage server according to claim 1, wherein after determining the storage information of the storage server, the method further comprises:

determining whether a strip that is not fully written exists before the m disks are newly inserted into the storage server;

in a case that the strip that is not fully written does not exist, executing the operation of determining, according to the storage information, the number n of the strips to be migrated; and in a case that the strip that is not fully written exists, considering the strip that is not fully written to be an empty strip, and executing the operation of determining, according to the storage information, the number n of the strips to be migrated.

7. The data migration method for the storage server according to claim 1, wherein after determining the data content of the check data blocks of the stripes, the method further comprises:

verifying whether a data migration process of the storage server is anomalous, and in a case that the data migration process of the storage server is anomalous, outputting prompt information.

8. The data migration method for the storage server according to claim 7, wherein after determining that the data migration process of the storage server is anomalous, the method further comprises:

recording an event log of this data migration process.

9. The data migration method for the storage server according to claim 1, wherein the storage server is a storage server in a distributed storage system.

10. The data migration method for the storage server according to claim 1, wherein the storage server is a storage server in a unified storage system.

11. The data migration method for the storage server according to claim 1, wherein the check data blocks are arranged in a left-handed misalignment manner.

12. The data migration method for the storage server according to claim 1, wherein the same encoding matrix is used to calculate erasure codes of the strips.

13. A data migration device of a storage server, comprising:

a memory, configured to store a computer program; and a processor, configured to execute the computer program to:

determine storage information of a storage server, wherein, the storage information is storage information of the storage server before inserting m disks;

determine, according to the storage information, the number n of strips to be migrated, wherein, the strips to be migrated are used to migrate to the m disks which are inserted into the storage server;

select n strips from among c strips according to a preset migration rule to serve as the strips to be migrated, and selecting, from the n strips to be migrated, data blocks to be migrated and migrating the data blocks from an original disk where the data blocks to be migrated is located to the disks which are newly inserted, so that after migration of the data blocks is completed, difference in strip usage between any two disks of the m disks in the storage server does not exceed 1, wherein the preset migration rule comprises: for any one of the data blocks to be migrated, determining a strip in which a check data block with the lowest strip serial number is located in a disk where the data block to be migrated is located before migration, and when the strip has a storage space that is not occupied by any data block to be migrated in the m disks which are newly inserted, migrating the data block to be migrated to the storage space, thereby a position limitation is imposed on placement of the data blocks to be migrated into the m newly inserted disks, so as to satisfy the requirements of load balancing; and determine data content of check data blocks of the strips so as to complete data migration of the storage server, and for c-n strips among the c strips that are not selected as the strips to be migrated, determine data content of check data blocks of the c-n strips by means of incremental update of an erasure code, user data blocks of the c-n strips which are remaining in original disks are not moved, so as to perform incremental update of the erasure code by combining data migrated to the m newly inserted disks, a type of the erasure code is Reed-Solomon Code (RS code) used for encoding k data blocks into r additional check blocks, parameters of the RS code, when implementing a storage erasure coding function, are determined on the basis of location information, a general algorithm relation of the erasure codes is summarized as:

$$P1 = a_{1,1}D1 \oplus a_{1,2}D2 \oplus \ldots \oplus a_{1,k}D_k$$
$$\ldots$$
$$Pr = a_{r,1}D1 \oplus a_{r,2}D2 \oplus \ldots \oplus a_{r,k}D_k,$$

wherein, $a_{1,1}$ to $a_{r,k}$ are selected from an encoding matrix of a Vandermonde matrix or an encoding matrix of a Cauchy matrix, P1 to Pr are check data blocks, D1 to Dk are user data blocks, $\oplus$ is addition in the Galois field, determine whether a total number of user data blocks before the m disks are newly inserted into the storage server is consistent with a total number of user data blocks after the m disks are inserted and data migration is performed, and in a case that the total number of user data blocks before the m disks are newly inserted into the storage server is inconsistent with the total number of user data blocks after the m disks are inserted and data migration is performed, determine a part of the user data blocks is not successfully migrated to the newly inserted disks, wherein n<c, m, n and c are all positive integers, and c represents the number of full strips in use by of the storage server before the m disks are newly inserted into the storage server, wherein select the n stripes from among the c stripes according to the preset migration rule to serve as the stripes to be migrated comprises:

use the n strips with highest strip serial numbers among the c strips to serve as the strips to be migrated, wherein the preset migration rule further comprises:

according to a rule that a stripe with a high stripe serial number takes precedence over a stripe with a low stripe serial number and when stripe serial numbers of two stripes are the same, a disk with a high disk serial number to which a data block to be migrated belongs takes precedence over a disk with a low disk serial number to which a data block to be migrated belongs, successively select each data block to be migrated from the n stripes to be migrated, and migrate same to the disks which are newly inserted; and upon completion of migration of any one of the data blocks to be migrated, in a case that the difference in the stripe usage between the any two disks in the storage server does not exceed 1, determine the migration being completed.

14. A non-transitory readable storage medium, wherein the non-transitory readable storage medium stores a computer program which, when being executed by a processor, cause the processor to:

determine storage information of a storage server, wherein, the storage information is storage information of the storage server before inserting m disks;

determine, according to the storage information, the number n of strips to be migrated, wherein, the strips to be migrated are used to migrate to the m disks which are inserted into the storage server;

select n strips from among c strips according to a preset migration rule to serve as the strips to be migrated, and selecting, from the n strips to be migrated, data blocks to be migrated and migrating the data blocks from an original disk where the data blocks to be migrated is located to the disks which are newly inserted, so that after migration of the data blocks is completed, difference in strip usage between any two disks of the m disks in the storage server does not exceed 1, wherein the preset migration rule comprises: for any one of the data blocks to be migrated, determining a strip in which a check data block with the lowest strip serial number is located in a disk where the data block to be migrated is located before migration, and when the strip has a storage space that is not occupied by any data block to be migrated in the m disks which are newly inserted, migrating the data block to be migrated to the storage space, thereby a position limitation is imposed on placement of the data blocks to be migrated into the m newly inserted disks, so as to satisfy the requirements of load balancing; and determine data content of check data blocks of the strips so as to complete data migration of the storage server, and for c-n strips among the c strips that are not selected as the strips to be migrated, determine data content of check data blocks of the c-n strips by means of incremental update of an erasure code, user data blocks of the c-n strips which are remaining in original disks are not moved, so as to perform incremental update of the erasure code by combining data migrated to the m newly inserted disks, a type of the erasure code is Reed-Solomon Code (RS code) used for encoding k data blocks into r additional check blocks, parameters of the RS code, when implementing a storage erasure coding function, are determined on the basis of location information, a general algorithm relation of the erasure codes is summarized as:

$$P1 = a_{1,1}D1 \oplus a_{1,2}D2 \oplus \ldots \oplus a_{1,k}D_k$$

$$\ldots$$

$$Pr = a_{r,1}D1 \oplus a_{r,2}D2 \oplus \ldots \oplus a_{r,k}D_k,$$

wherein, $a_{1,1}$ to $a_{r,k}$ are selected from an encoding matrix of a Vandermonde matrix or an encoding matrix of a Cauchy matrix, P1 to Pr are check data blocks, D1 to Dk are user data blocks, $\oplus$ is addition in the Galois field, determine whether a total number of user data blocks before the m disks are newly inserted into the storage server is consistent with a total number of user data blocks after the m disks are inserted and data migration is performed, and in a case that the total number of user data blocks before the m disks are newly inserted into the storage server is inconsistent with the total number of user data blocks after the m disks are inserted and data migration is performed, determine a part of the user data blocks is not successfully migrated to the newly inserted disks, wherein n<c, m, n and c are all positive integers, and c represents the number of full strips in use by of the storage server before the m disks are newly inserted into the storage server, wherein select the n stripes from among the c stripes according to the preset migration rule to serve as the stripes to be migrated comprises:

use the n strips with highest strip serial numbers among the c strips to serve as the strips to be migrated, wherein the preset migration rule further comprises:

according to a rule that a stripe with a high stripe serial number takes precedence over a stripe with a low stripe serial number and when stripe serial numbers of two stripes are the same, a disk with a high disk serial number to which a data block to be migrated belongs takes precedence over a disk with a low disk serial number to which a data block to be migrated belongs, successively select each data block to be migrated from the n stripes to be migrated, and migrate same to the disks which are newly inserted; and upon completion of migration of any one of the data blocks to be migrated, in a case that the difference in the stripe usage between the any two disks in the storage server does not exceed 1, determine the migration being completed.

* * * * *